US012800375B2

(12) United States Patent
Matsumoto et al.

(10) Patent No.: US 12,800,375 B2
(45) Date of Patent: Nov. 17, 2026

(54) AIR FLOW RATE MEASURING DEVICE AND AIR FLOW RATE MEASURING METHOD

(71) Applicant: Hitachi Astemo, Ltd., Hitachinaka (JP)

(72) Inventors: Masahiro Matsumoto, Hitachinaka (JP); Ryohsuke Doi, Hitachinaka (JP); Yushi Araki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 266 days.

(21) Appl. No.: 18/712,110

(22) PCT Filed: Nov. 30, 2021

(86) PCT No.: PCT/JP2021/043818
§ 371 (c)(1),
(2) Date: May 21, 2024

(87) PCT Pub. No.: WO2023/100232
PCT Pub. Date: Jun. 8, 2023

(65) Prior Publication Data
US 2026/0168837 A1 Jun. 18, 2026

(51) Int. Cl.
*G01F 15/02* (2006.01)
*G01F 15/04* (2006.01)

(52) U.S. Cl.
CPC .......... *G01F 15/028* (2013.01); *G01F 15/046* (2013.01)

(58) Field of Classification Search
CPC ........ G01F 15/02; G01F 15/028; G01F 15/04; G01F 5/00
See application file for complete search history.

(56) References Cited

U.S. PATENT DOCUMENTS 10,139,259 B2 * 11/2018 Chen .......................... G01F 5/00

FOREIGN PATENT DOCUMENTS

JP 60205316 A * 10/1985

OTHER PUBLICATIONS

International Search Report and Written Opinion, with English translations, for PCT/JP2021/043818, dated Jan. 25, 2022, 9 pages.

* cited by examiner

*Primary Examiner* — Erika J. Villaluna
(74) *Attorney, Agent, or Firm* — Foley & Lardner LLP

(57) ABSTRACT

An air flow rate measurement device includes an air flow rate detection device which detects an air flow rate of an air flow moving in a pipe and generates an input signal corresponding to the air flow rate and a calculation unit which determines whether the air flow is a laminar flow or a turbulent flow based on the input signal and outputs a result of calculation using an output result obtained by performing proportional calculation on the input signal when it is determined that the air flow is a laminar flow or a result of calculation using an output result obtained by performing square calculation on the input signal when it is determined that the air flow is a turbulent flow as an output signal corresponding to the air flow rate.

12 Claims, 9 Drawing Sheets

AIR FLOW RATE MEASURING DEVICE AND AIR FLOW RATE MEASURING METHOD

TECHNICAL FIELD

The present invention relates to an air flow rate measurement device and an air flow rate measurement method.

BACKGROUND ART

Conventionally, an air flow rate measurement device that measures the flow rate of air moving in a pipe has been used. The air flow rate measurement device is a device for measuring an air flow rate serving as an index for improving the fuel efficiency of an engine. Accordingly, the air flow rate measurement device is installed, for example, in the intake pipe of an automobile engine. The air in the intake pipe is taken into the cylinder in an intake stroke. Thereafter, a combustion stroke, an expansion stroke, and an exhaust stroke are performed, and an intake stroke is performed again.

It is known that when fuel efficiency of an engine is improved, pulsation occurs in the flow of air in the intake pipe. This principle will be briefly described. When the piston movement is performed in the cylinder, the flow velocity of air in the intake pipe changes in accordance with the piston movement. Such a change in the flow velocity of air is called pulsation. When pulsation occurs in the intake pipe, the air flow rate measured by the air flow rate measurement device is affected, and an error (referred to as a "pulsation error") occurs in an average value (average flow rate) of the air flow rate. The pulsation error represents a difference between the average value of the air flow rate measured by the air flow rate measurement device and the average value of the true air flow rate. The pulsation amplitude ratio is an index representing the magnitude of pulsation by a ratio between the pulsation amplitude and the average flow rate. In general, when the pulsation amplitude ratio increases, the pulsation error increases.

For example, when a throttle valve provided in the intake pipe is closed and air in the intake pipe becomes difficult to flow, an energy loss occurs, and thus fuel efficiency deteriorates. However, when the throttle valve is closed, even if pulsation occurs in the engine, the influence of the pulsation is less likely to be exerted on the intake pipe. On the other hand, in order to improve the fuel efficiency, the throttle valve is opened. When the throttle valve is opened, the influence of the pulsation generated in the engine easily reaches the air in the intake pipe, and the influence of the pulsation error generated in the air flow rate increases.

As an example of a method for reducing the pulsation error, there is a technique described in PTL 1. PTL 1 describes a technique for obtaining an air flow rate flowing through an intake pipe from the air flow rate of a sub-passage measured by an air flow rate detection element.

CITATION LIST

Patent Literature

PTL 1: JP 2018-205134 A

SUMMARY OF INVENTION

Technical Problem

Here, the installation location of the conventional air flow rate measurement device described in PTL 1 will be described.

FIG. 1 is a diagram illustrating an example of the installation location of the air flow rate detection device. Referring to FIG. 1, a conventional air flow rate detection device 100 will be described, but an air flow rate detection device 2 according to an embodiment to be described later is also arranged similarly to the air flow rate detection device 100.

The air taken into the engine moves through an intake pipe 16 from the left side to the right side in FIG. 1. Here, a sub-passage 17 for branching air is provided in part of the intake pipe 16. A portion of the intake pipe 16 which corresponds to the installation location of the sub-passage 17 is referred to as a main passage 18 through which most of the air in the intake pipe 16 flows. The air flow rate detection device 100 is installed in the sub-passage 17 and detects the air flow rate of the sub-passage 17. The air flow rate detection device 100 outputs a detection signal upon detecting the air flowing through the sub-passage 17. An electronic control device (not illustrated) obtains an air flow rate $Q_2$ of the air flowing through the sub-passage 17 based on a detection signal output from the air flow rate detection device 100. Then, the electronic control device obtains an air flow rate $Q_1$ of the main passage 18 by numerical calculation from the air flow rate $Q_2$ of the sub-passage 17.

Disposing the air flow rate detection device 100 in the sub-passage 17 is useful for countermeasures against contamination and water in the air flow rate detection device 100. However, the passage diameter of the sub-passage 17 is smaller than the passage diameter of the main passage 18. In general, the air flow of air flowing through the passage is a laminar flow when the flow velocity is low and is a turbulent flow when the flow velocity is high. In addition, the smaller the passage diameter, the larger the flow velocity at the time of changing from a laminar flow to a turbulent flow. Therefore, when the flow rate $Q_1$ of the main passage 18 is gradually increased, the flow of the main passage 18 becomes a turbulent flow at an early stage, but the flow of the sub-passage 17 is in a laminar flow state. In addition, the calculation formula for a pressure loss differs between a laminar flow and a turbulent flow.

However, according to the conventional technique disclosed in PTL 1, all flow rate ranges are calculated by a calculation formula of a turbulent flow. Therefore, when the air flow rate $Q_1$ of the main passage 18 is obtained by numerical calculation from the air flow rate $Q_2$ of the sub-passage 17, the pulsation error of the air flow rate particularly in the low flow rate region (for example, low pulsation amplitude ratio (0 to 100%)) is large. That is, in order to obtain the air flow rate $Q_1$ of the main passage 18 from the air flow rate $Q_2$ of the sub-passage 17 by numerical calculation, it is necessary to change the calculation formula between a laminar flow and a turbulent flow, but the above-described conventional technique lacks consideration for this.

The present invention has been made in view of such a situation, and an object thereof is to reduce the pulsation error of an air flow rate in a low flow rate region.

Solution to Problem

An air flow rate measurement device according to the present invention includes an air flow rate detection device which detects an air flow rate of an air flow moving in a pipe and generates an input signal corresponding to the air flow rate and a calculation unit which determines whether the air flow is a laminar flow or a turbulent flow based on the input signal and outputs a result of calculation using an output result obtained by performing proportional calculation on the input signal when it is determined that the air flow is a laminar flow or a result of calculation using an output result obtained by performing square calculation on the input signal when it is determined that the air flow is a turbulent flow as an output signal corresponding to the air flow rate.

Advantageous Effects of Invention

According to the present invention, it is possible to obtain an air flow rate by reducing the pulsation error in a low flow rate region.

DESCRIPTION OF EMBODIMENTS

Figure 1:
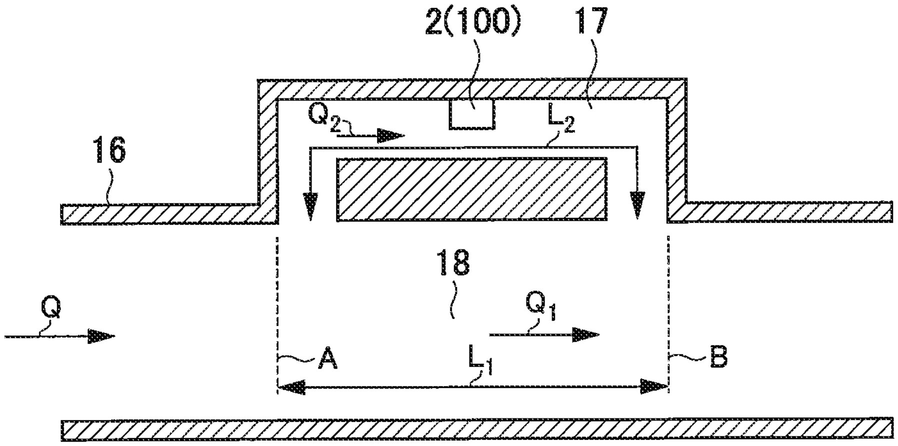
FIG. 1 is a diagram illustrating an example of the installation location of an air flow rate detection device.

Hereinafter, embodiments of the present invention will be described with reference to the accompanying drawings. In the present specification and the drawings, components having substantially the same function or configuration are denoted by the same reference numerals, and redundant description is omitted.

First Embodiment

First, a configuration example of an air flow rate measurement device according to the first embodiment of the present invention will be described with reference to FIGS. 1 to 6.

Figure 2:
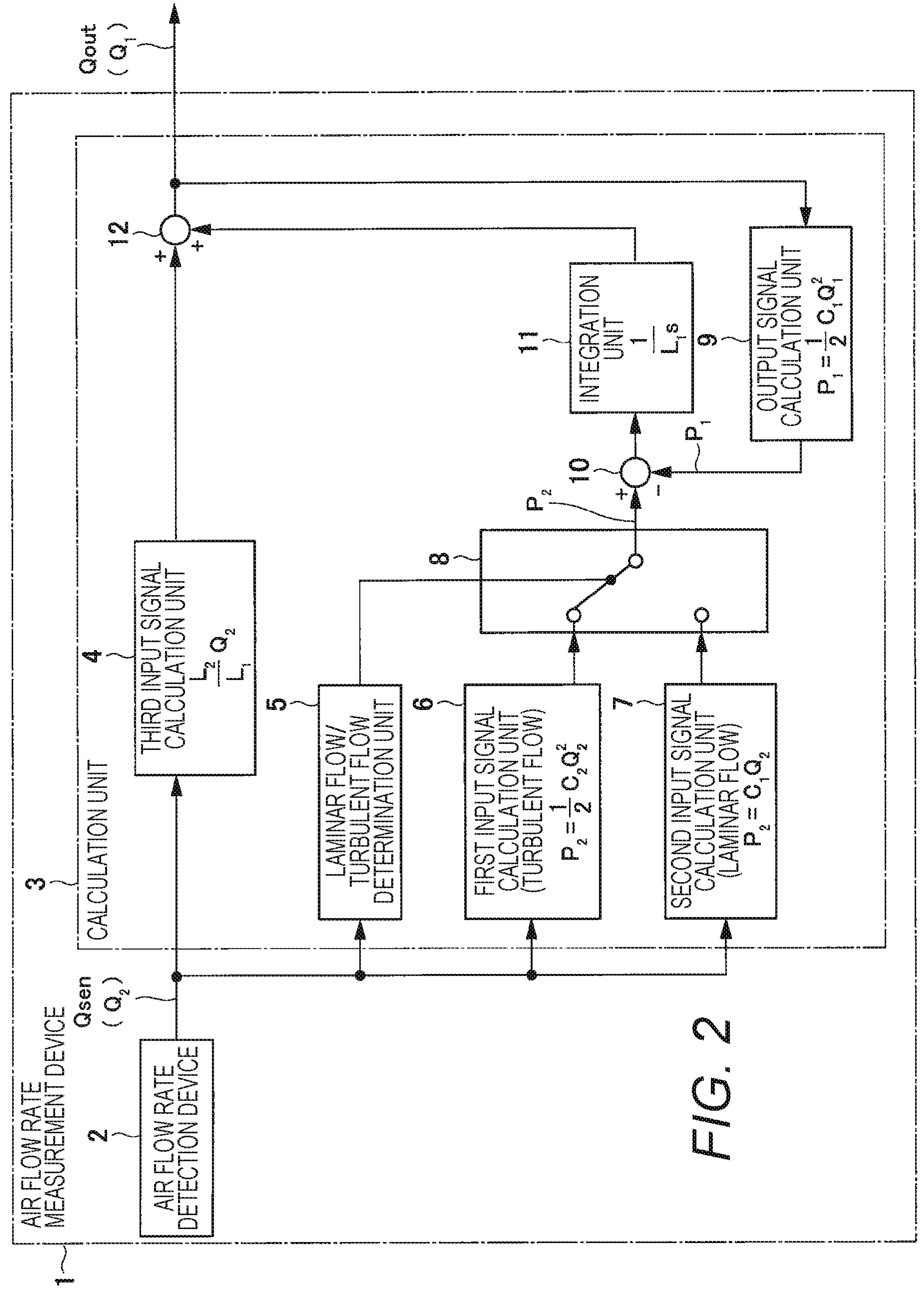
FIG. 2 is a diagram illustrating a configuration example of the air flow rate measurement device according to the first embodiment of the present invention.
Figure 3:
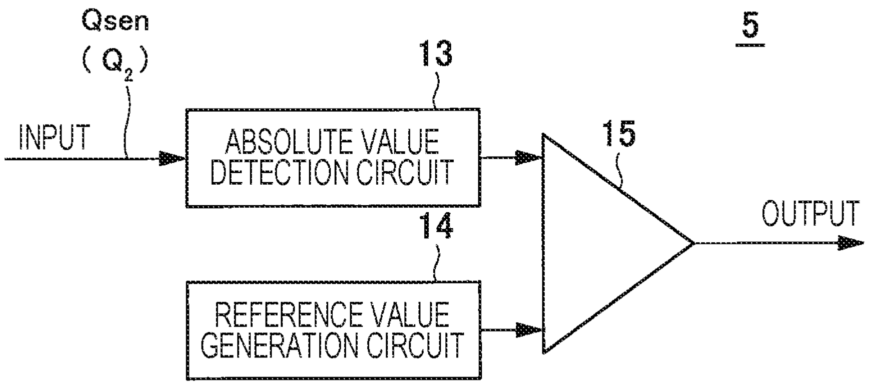
FIG. 3 is a diagram illustrating an internal configuration example of a laminar flow/turbulent flow determination unit according to the first embodiment of the present invention.
Figure 4:
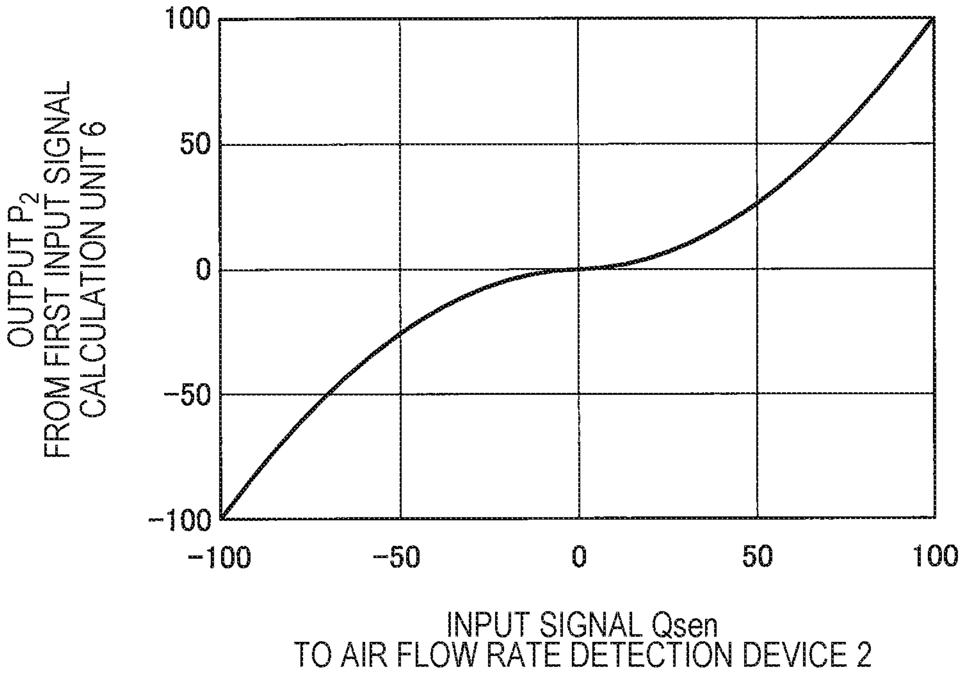
FIG. 4 is a diagram illustrating an example of an output characteristic of a first input signal calculation unit with respect to an output signal from the air flow rate detection device according to the first embodiment of the present invention.
Figure 5:
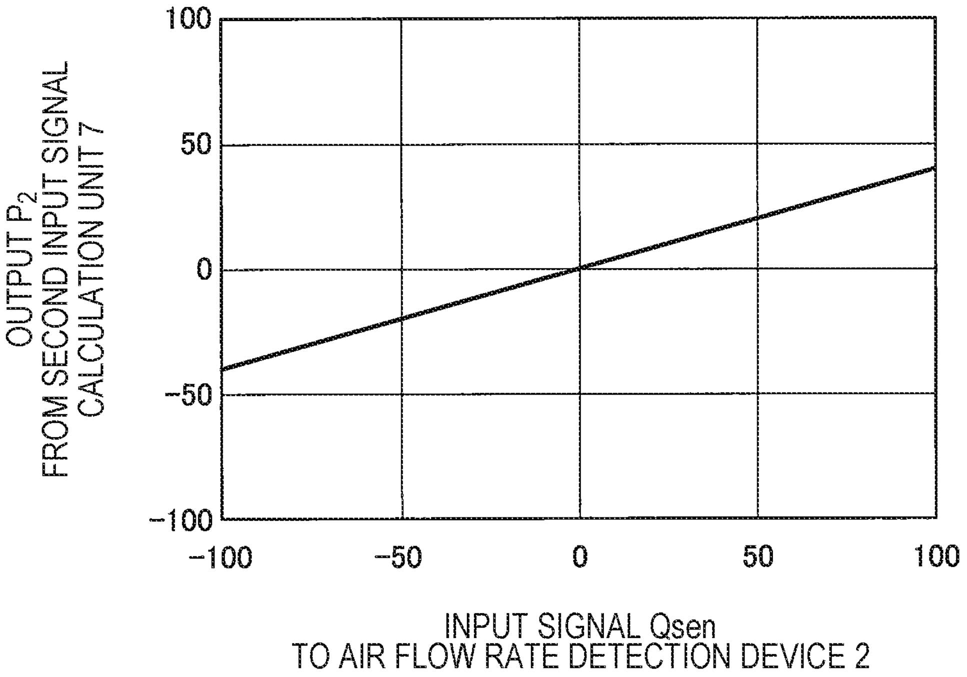
FIG. 5 is a diagram illustrating an example of an output characteristic of a second input signal calculation unit with respect to an output signal from the air flow rate detection device according to the first embodiment of the present invention.
Figure 6:
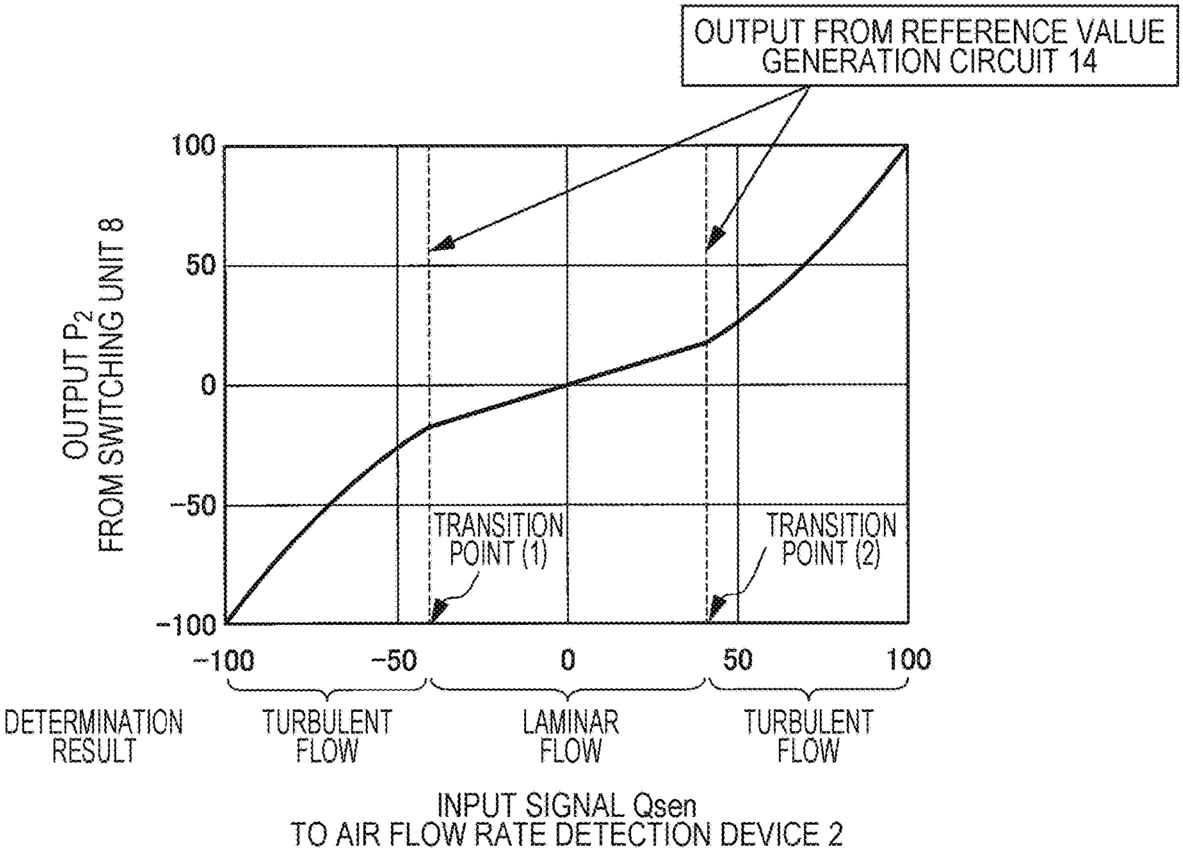
FIG. 6 is a diagram illustrating an example of an output characteristic of a switching unit with respect to an output signal from the air flow rate detection device according to the first embodiment of the present invention.

FIG. 1 is a diagram illustrating an example of the installation location of an air flow rate detection device according to the first embodiment. FIG. 2 is a diagram illustrating a configuration example of an air flow rate measurement device 1 according to the first embodiment. FIG. 3 is a diagram showing a configuration example of a laminar flow/turbulent flow determination unit 5 shown in FIG. 2. FIG. 4 is a diagram illustrating an example of input/output characteristics of a first input signal calculation unit 6 illustrated in FIG. 2. FIG. 5 is a diagram illustrating an example of input/output characteristics of a second input signal calculation unit 7 illustrated in FIG. 2. FIG. 6 is a diagram illustrating an example of an output of a switching unit 8 illustrated in FIG. 2.

As illustrated in FIG. 2, the air flow rate measurement device 1 according to the present embodiment includes a calculation unit 3 in addition to an air flow rate detection device 2 illustrated in FIG. 1.

The air flow rate detection device (the air flow rate detection device 2) detects an air flow rate $Q_2$ of air moving in a pipe (for example, a sub-passage 17) illustrated in FIG. 1, which is a measurement target of the air flow rate measurement device 1, and generates an input signal Qsen corresponding to the air flow rate $Q_2$. The input signal Qsen is input to the calculation unit 3 as a signal corresponding to the air flow rate $Q_2$ in the sub-passage 17.

The calculation unit 3 performs predetermined calculation processing on the input signal Qsen input from the air flow rate detection device 2 and outputs an output signal Qout corresponding to the air flow rate. Here, the calculation unit (the calculation unit 3) determines whether the air flow is a laminar flow or a turbulent flow on the basis of the input signal Qsen and outputs, as the output signal Qout according to the air flow rate, a result of calculation using an output result obtained by performing proportional calculation on the input signal Qsen when it is determined that the air flow is a laminar flow, or a result of calculation using an output result obtained by performing square calculation on the input signal Qsen when it is determined that the air flow is a turbulent flow. The calculation unit 3 includes a third input signal calculation unit 4, a laminar flow/turbulent flow determination unit 5, a first input signal calculation unit 6, a second input signal calculation unit 7, a switching unit 8, a subtraction unit 10, an integration unit 11, an output signal calculation unit 9, and an addition unit 12. Each functional unit of the calculation unit 3 illustrated in FIG. 2 is provided with a calculation formula and a value in each term used in formula (5) described later.

The third input signal calculation unit (the third input signal calculation unit 4) performs a predetermined calculation on the input signal Qsen of the air flow rate detection device 2. For example, the third input signal calculation unit 4 performs calculation of multiplying the air flow rate $Q_2$ represented by the input signal Qsen by the value obtained by dividing the passage length $L_2$ of the sub-passage 17 by the passage length $L_1$ of the main passage 18.

The laminar flow/turbulent flow determination unit (the laminar flow/turbulent flow determination unit 5) determines whether the air flow flowing around the air flow rate detection device 2 is a laminar flow or a turbulent flow based on the input signal Qsen of the air flow rate detection device 2. The laminar flow/turbulent flow determination unit 5 according to the first embodiment determines whether the air flow is a laminar flow or a turbulent flow by comparing the reference value with the absolute value of the air flow rate $Q_2$.

The first input signal calculation unit (the first input signal calculation unit 6) performs a square calculation on the input signal Qsen of the air flow rate detection device 2. By the square calculation, an output result $P_2$ of the turbulent flow is obtained with respect to the air flow rate $Q_2$.

The second input signal calculation unit (the second input signal calculation unit 7) performs a proportional calculation on the input signal Qsen of the air flow rate detection device 2. By the proportional calculation, the laminar flow output result $P_2$ is obtained with respect to the air flow rate $Q_2$.

The switching unit (the switching unit 8) switches between the output result of the first input signal calculation unit (the first input signal calculation unit 6) and the output result of the second input signal calculation unit (the second input signal calculation unit 7) based on the determination result of the laminar flow/turbulent flow determination unit (the laminar flow/turbulent flow determination unit 5) and outputs the switched output result $P_2$ to the subtraction unit 10.

The output signal calculation unit (the output signal calculation unit 9) performs square calculation on the output signal Qout from the addition unit 12 and outputs an output result $P_1$ to the subtraction unit 10.

The subtraction unit (the subtraction unit 10) obtains a difference between the output result $P_2$ of the first input signal calculation unit (the first input signal calculation unit 6) or the output result $P_2$ of the second input signal calculation unit (the second input signal calculation unit 7) switched by the switching unit 8 (the switching unit 8) and the output result $P_1$ of the output signal calculation unit (the output signal calculation unit 9).

The integration unit (the integration unit 11) integrates the difference obtained by the subtraction unit (the subtraction unit 10) and outputs an integration result.

The addition unit (the addition unit 12) adds the output result of the third input signal calculation unit (the third input signal calculation unit 4) and the integration result of the integration unit (the integration unit 11) and outputs the output signal Qout of the calculation unit (the calculation unit 3).

Next, the configuration of the laminar flow/turbulent flow determination unit 5 will be described with reference to FIG. 3.

FIG. 3 is a diagram illustrating an internal configuration example of the laminar flow/turbulent flow determination unit 5.

The laminar flow/turbulent flow determination unit (the laminar flow/turbulent flow determination unit 5) determines whether the air flow is a laminar flow or a turbulent flow based on the instantaneous value of the input signal Qsen. Therefore, the laminar flow/turbulent flow determination unit 5 includes an absolute value detection circuit 13, a reference value generation circuit 14, and a comparison unit 15.

The absolute value detection circuit 13 obtains the absolute value of the input signal Qsen of the air flow rate detection device 2.

The reference value generation circuit 14 generates a reference value.

The comparison unit 15 compares the output of the absolute value detection circuit 13 with the output of the reference value generation circuit 14.

That is, the laminar flow/turbulent flow determination unit 5 obtains the absolute value of an instantaneous value of the input signal Qsen of the air flow rate detection device 2 by the absolute value detection circuit 13. If the absolute value is larger than the output (reference value) of the reference value generation circuit 14, the laminar flow/turbulent flow determination unit 5 determines that the flow is a turbulent flow, and if the absolute value is equal to or smaller than the output of the reference value generation circuit 14, the laminar flow/turbulent flow determination unit 5 outputs a determination result indicating that the flow is a laminar flow to the switching unit 8.

Next, an example of the operation of the first input signal calculation unit 6 illustrated in FIG. 2 will be described with reference to FIG. 4.

FIG. 4 is a diagram illustrating an example of an output characteristic of the first input signal calculation unit 6 with respect to the input signal Qsen of the air flow rate detection device 2. The horizontal axis of the graph illustrated in FIG. 4 represents the value of the input signal Qsen of the air flow rate detection device 2, and the vertical axis represents the output result $P_2$ of the first input signal calculation unit 6.

When the input signal Qsen of the air flow rate detection device 2 is positive, the first input signal calculation unit 6 outputs the result of simple square calculation on the input signal Qsen. On the other hand, when the input signal Qsen is negative, the first input signal calculation unit 6 performs a square calculation on the input signal Qsen. Then, the first input signal calculation unit 6 outputs the result obtained by converting the sign of the input signal Qsen to negative sign. The case where the input signal Qsen is negative indicates that the air flows backward in the pipe. For example, when the pulsation amplitude ratio increases, the air flowing through the intake pipe 16 starts to flow backward. Through such processing, the first input signal calculation unit 6 generates the output signal illustrated in FIG. 4.

Next, an example of the operation of the second input signal calculation unit 7 illustrated in FIG. 2 will be described with reference to FIG. 5.

FIG. 5 is a diagram illustrating an example of an output characteristic of the second input signal calculation unit 7 with respect to the input signal Qsen of the air flow rate detection device 2. The horizontal axis of the graph illustrated in FIG. 5 represents the value of the input signal Qsen of the air flow rate detection device 2, and the vertical axis represents the output result $P_2$ of the second input signal calculation unit 7.

The second input signal calculation unit 7 outputs a proportional calculation result with respect to the input signal Qsen of the air flow rate detection device 2. Through such processing, the second input signal calculation unit 7 generates the output signal illustrated in FIG. 5.

Next, an example of the operation of the switching unit 8 illustrated in FIG. 2 will be described with reference to FIG. 6.

FIG. 6 is a diagram illustrating an example of output characteristics of the switching unit 8 with respect to the input signal Qsen of the air flow rate detection device 2. The horizontal axis of the graph illustrated in FIG. 6 represents the value of the input signal Qsen of the air flow rate detection device 2, and the vertical axis represents the output result $P_2$ of the switching unit 8.

The switching unit 8 switches and outputs the output of the first input signal calculation unit 6 and the output of the second input signal calculation unit 7 according to the instantaneous value of the output of the laminar flow/turbulent flow determination unit 5. When the absolute value of the instantaneous value of the input signal Qsen of the air flow rate detection device 2 is larger than the output of the reference value generation circuit 14, the laminar flow/turbulent flow determination unit 5 outputs a determination result of determining that the air flow is a turbulent flow, and when the absolute value of the instantaneous value of the input signal Qsen is equal to or smaller than the output of the reference value generation circuit 14, the laminar flow/turbulent flow determination unit 5 outputs a determination result of determining that the air flow is a laminar flow. Then, the switching unit 8 outputs the output result obtained by the first input signal calculation unit 6 when the determination result indicating that the air flow is a turbulent flow is input. The switching unit 8 outputs the output result obtained by the second input signal calculation unit 7 when the determination result indicating that the air flow is a laminar flow is input.

FIG. 6 shows examples of transition points (1) and (2) used when the switching unit 8 performs turbulent flow/laminar flow determination. Transition points (1) and (2) are points at which laminar flow/turbulent flow determination results are switched and correspond to values generated as reference values from the reference value generation circuit 14 shown in FIG. 3.

For example, if the intake pipe 16 has a symmetrical shape about the installation position of the air flow rate detection device 2, transition points (1) and (2) are set at positions equidistantly away from "0" of the input signal Qsen of the air flow rate detection device 2 in the positive and negative directions. That is, transition points (1) and (2) are values output as reference values from the reference value generation circuit 14.

As illustrated in FIG. 6, when the absolute value of the instantaneous value of the input signal Qsen of the air flow rate detection device 2 is smaller than the output of the reference value generation circuit 14, the output of the switching unit 8 is the output of the second input signal calculation unit 7 (the output proportional to the input signal Qsen of the air flow rate detection device 2). On the other hand, when the absolute value of the instantaneous value of the input signal Qsen of the air flow rate detection device 2 is larger than the output of the reference value generation circuit 14, the output of the switching unit 8 is the output of the first input signal calculation unit 6 (the output obtained by squaring the input signal Qsen of the air flow rate detection device 2). Referring to FIG. 6, the determination result (laminar flow or turbulent flow), which is the output of the switching unit 8, is described with reference to transition points (1) and (2).

If the intake pipe 16 has an asymmetric shape, the value of the transition point changes depending on whether the air flow is a forward flow or backward flow. For example, when the intake pipe 16 is narrowed, bulged, or bent, the intake pipe 16 tends to have an asymmetric shape. In this case, two comparison units 15 may be provided in accordance with the respective transition points, and the two comparison units 15 may determine a laminar flow or turbulent flow according to each transition point.

Next, an arrangement example of the air flow rate measurement device 1 in the intake pipe 16 will be described with reference to FIG. 1. An air flow Q flows into the intake pipe 16, the main passage 18 and the sub-passage 17 are provided in the intake pipe 16, and the air flow rate detection device 2 is installed in the sub-passage 17.

Next, an example of the operation of the air flow rate measurement device 1 will be described. As illustrated in FIG. 1, the air flow with the air flow rate Q flowing through the intake pipe 16 is divided into the main passage 18 and the sub-passage 17. Assuming that the flow rate of the main passage 18 is $Q_1$ and the flow rate of the sub-passage 17 is $Q_2$, a pressure difference Op between upstream surface A and downstream surface B of the main passage 18 is expressed by the Navier-Stokes equation as follows.

[Math. 1]

$$\frac{\Delta p}{\rho} = L_1\frac{dQ_1}{dt} + \frac{1}{2}C_1Q_1^2 \quad (1)$$

$$\frac{\Delta p}{\rho} = L_2\frac{dQ_2}{dt} + \frac{1}{2}C_2Q_2^2 \quad (2)$$

Here, the constants of equations (1) and (2) are defined as follows.

ρ: density of fluid

Δρ: pressure difference between surface A and surface B $L_1$: passage length of main passage 18

$L_2$: passage length of sub-passage 17

$C_1$: loss coefficient of main passage 18

$C_2$: loss coefficient of sub-passage 17

Here, when equation (2) is substituted into equation (1) to obtain the flow rate $Q_1$, following equation (3) given below is obtained.

[Math. 2]

$$Q_1 = \frac{L_2}{L_1}Q_2 + \frac{1}{L_1}\int\left(\frac{1}{2}C_2Q_2^2 - \frac{1}{2}C_1Q_1^2\right)dt \quad (3)$$

Here, since $Q=Q_1+Q_2$, the air flow rate Q of the air flowing through the intake pipe 16 is expressed by equation (4) given below.

[Math. 3]

$$Q = \frac{L_2}{L_1}Q_2 + \frac{1}{L_1}\int\left(\frac{1}{2}C_2Q_2^2 - \frac{1}{2}C_1Q_1^2\right)dt + Q_2 \quad (4)$$

Here, if it can be assumed that the flow rate $Q_2$ is sufficiently smaller than the flow rate $Q_1$, the air flow rate Q flowing through the intake pipe 16 is expressed by equation (5) given below.

[Math. 4]

$$Q = \frac{L_2}{L_1}Q_2 + \frac{1}{L_1}\int\left(\frac{1}{2}C_2Q_2^2 - \frac{1}{2}C_1Q_1^2\right)dt \quad (5)$$

Since the flow rate of the air flow measured by the air flow rate measurement device 1 is the flow rate $Q_2$ of the sub-passage 17, the air flow rate measurement device 1 can obtain the flow rate of the air flow rate Q from the flow rate $Q_2$ every moment by solving equation (5). This is true even when the air flow rate Q flowing through the intake pipe 16 is in a pulsation state, and the air flow rate Q of the air flowing through the intake pipe 16 can be obtained every moment from the flow rate $Q_2$ of the sub-passage 17.

That is, the air flow rate measurement device 1 can accurately obtain the flow rate Q of the air flowing through the intake pipe 16 without being affected by pulsation regardless of any pulsation state of the flow rate Q of the air flowing through the intake pipe 16. That is, a pulsation error caused by pulsation can be eliminated. In addition, the air flow rate measurement device 1 according to the present embodiment can obtain the air flow rate Q of the air flowing through the intake pipe 16 from the flow rate $Q_2$ of the sub-passage 17 from moment to moment even if the pulsation waveform is not a sine wave but a distorted waveform including harmonics, and thus can reduce a pulsation error.

According to PTL 1 described above, a loss coefficient $C_1$ of the main passage 18 and a loss coefficient $C_2$ of the sub-passage 17 are considered as fixed values. However, when the air flow is a laminar flow, the loss factor is inversely proportional to the flow rate. That is, the pressure difference $\Delta p$ is proportional to the air flow rate. Since the consideration for this is lacking in PTL 1, the pulsation error at a low flow rate has increased.

In particular, since the passage width of the sub-passage 17 is narrower than the passage width of the main passage 18, the influence of the transition from a laminar flow to a turbulent flow with respect to the sub-passage 17 maintaining the laminar flow state up to a higher flow rate is large. For this reason, the present embodiment adopts the configuration illustrated in FIG. 2 that enables the calculation of equation (5) in consideration of the transition from a laminar flow to a turbulent flow at the time of calculation on the sub-passage 17 side. The air flow rate measurement device 1 changes the first term in the integral of equation (5) to the output of the first input signal calculation unit 6 if the flow rate $Q_2$ of the sub-passage 17 is in a high flow rate region where the air flow is a turbulent flow.

In contrast, the air flow rate measurement device 1 changes the first term in the integral of equation (5) to the output of the second input signal calculation unit 7 if the flow rate $Q_2$ of the sub-passage 17 is in a low flow rate region (for example, the flow velocity during idling is 1 m/s or less) where the air flow is a laminar flow. Therefore, the air flow rate measurement device 1 can obtain the air flow rate Q of the air flowing through the intake pipe 16 from the flow rate $Q_2$ of the sub-passage 17 from moment to moment with higher accuracy even if the flow rate $Q_2$ of the sub-passage 17 is in a low flow rate region where the air flow is a laminar flow. Therefore, the air flow rate measurement device 1 can provide a pulsation error correction process capable of reducing a pulsation error in a low flow rate region as compared with the related art.

<Hardware Configuration of Computer>

Next, the hardware configuration of a computer 30 constituting the air flow rate measurement device 1 will be described.

Figure 7:
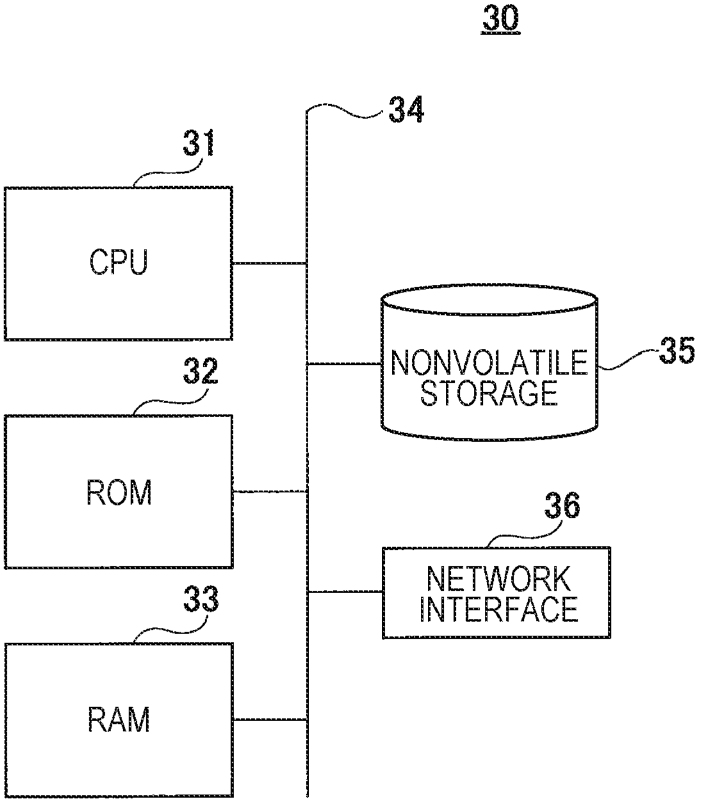
FIG. 7 is a block diagram illustrating a hardware configuration example of a computer according to the first embodiment of the present invention.

FIG. 7 is a block diagram illustrating a hardware configuration example of the computer 30. The computer 30 is an example of hardware used as a computer operable as the air flow rate measurement device 1 according to the present embodiment. The air flow rate measurement device 1 according to the present embodiment can implement the air flow rate measurement method performed by the respective functional blocks illustrated in FIG. 2 in cooperation with each other by the computer 30 (computer) executing a program.

The computer 30 includes a central processing unit (CPU) 31, a read only memory (ROM) 32, and a random access memory (RAM) 33 each connected to a bus 34. The computer 30 further includes a nonvolatile storage 35 and a network interface 36.

The CPU 31 reads program codes of software for implementing each function according to the present embodiment from the ROM 32, loads the program codes into the RAM 33, and executes the program codes. Variables, parameters, and the like generated during arithmetic processing by the CPU 31 are temporarily written to the RAM 33, and these variables, parameters, and the like are appropriately read by the CPU 31. However, a micro processing unit (MPU) may be used instead of the CPU 31. Each function of the calculation unit 3 illustrated in FIG. 2 is implemented by a program executed by the CPU 31.

As the nonvolatile storage 35, for example, a hard disk drive (HDD), a solid state drive (SSD), a flexible disk, an optical disk, a magneto-optical disk, a CD-ROM, a CD-R, a magnetic tape, a nonvolatile memory, or the like is used. In addition to an operating system (OS) and various parameters, a program for causing the computer 30 to function is recorded in the nonvolatile storage 35. The ROM 32 and the nonvolatile storage 35 record programs, data, and the like necessary for the operation of the CPU 31 and are used as an example of a computer-readable non-transitory storage medium storing a program executed by the computer 30.

For example, a network interface card (NIC) or the like is used as the network interface 36, and various data can be transmitted and received between devices via a local area network (LAN), a dedicated line, or the like connected to a terminal of the NIC. For example, the output signal Qout is output to an external device (another electronic control device or the like) connected to the air flow rate measurement device 1 through the network interface 36.

In the air flow rate measurement device 1 according to the first embodiment described above, since the calculation unit 3 switches the output result in consideration of the transition between a laminar flow and a turbulent flow, a result in which the pulsation error is reduced can be obtained. Therefore, even in a low flow rate region, it is possible to obtain an accurate measurement result of the air flow rate with a reduced pulsation error.

Second Embodiment

A configuration example of an air flow rate measurement device according to the second embodiment of the present invention will be described next with reference to FIG. 8.

Figure 8:
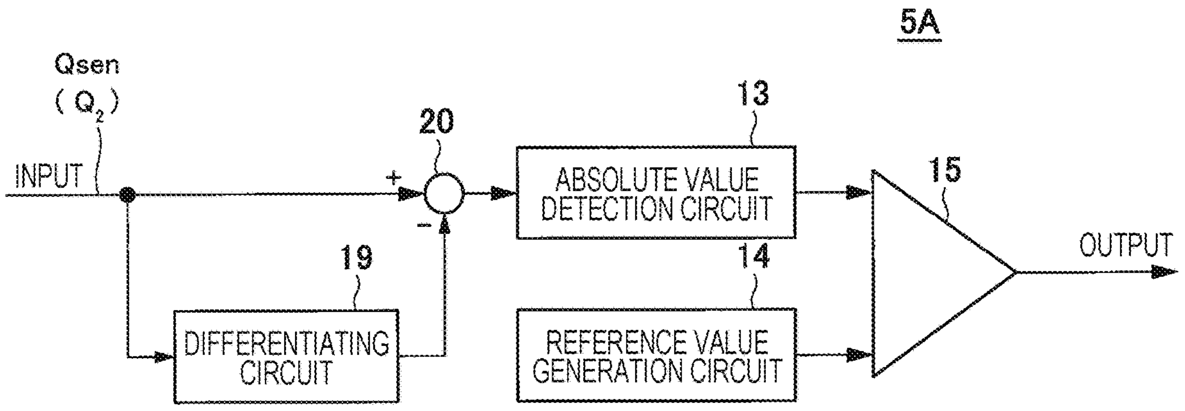
FIG. 8 is a block diagram showing a configuration example of a laminar flow/turbulent flow determination unit according to a second embodiment of the present invention.

FIG. 8 is a block diagram illustrating a configuration example of a laminar flow/turbulent flow determination unit 5A according to the second embodiment.

The air flow rate measurement device 1 according to the second embodiment is basically the same as the air flow rate measurement device 1 according to the first embodiment but is different in including the laminar flow/turbulent flow determination unit 5A in which the configuration of the laminar flow/turbulent flow determination unit 5 is changed as shown in FIG. 8. The laminar flow/turbulent flow determination unit 5A according to the second embodiment basically has a function of performing laminar flow/turbulent flow determination similarly to the laminar flow/turbulent flow determination unit 5 according to the first embodiment. Note that the laminar flow/turbulent flow determination unit (the laminar flow/turbulent flow determination unit 5A) determines whether the air flow is a laminar flow or a turbulent flow based on the differential value of the input signal Qsen. Therefore, the laminar flow/turbulent flow determination unit 5A is added with a differentiating circuit 19 that differentiates an input signal Qsen and a subtraction unit 20 (an example of a second subtraction unit) that obtains a difference in output between the input signal Qsen and the differentiating circuit 19.

The flow velocity at which a laminar flow transitions to a turbulent flow depends on the flow velocity in a steady flow. When the flow velocity is small, the air flow becomes a laminar flow. When the flow velocity is large, the air flow becomes a turbulent flow. However, in an accelerated flow, as the acceleration increases, the flow velocity for transition from a laminar flow to a turbulent flow increases, whereas in a decelerated flow, as the acceleration increases, the flow velocity for transition from a laminar flow to a turbulent flow decreases. Since the air flow rate measurement device 1 according to the second embodiment handles a pulsating flow, an accelerating flow and a decelerating flow are repeated.

In order to cope with this, in the second embodiment, the differentiating circuit 19 is provided to obtain the acceleration of the flow velocity, and the subtraction unit 20 is provided to obtain the difference between the input signal Qsen and the output value of the differentiating circuit 19. As the acceleration of the flow velocity increases, the flow velocity subtracted from the input signal Qsen by the subtraction unit 20 increases. Conversely, the smaller the acceleration of the flow velocity, the smaller the flow velocity subtracted from the input signal Qsen.

Therefore, by providing the subtraction unit 20, the laminar flow/turbulent flow determination unit 5A can more accurately obtain the transition point between a laminar flow and a turbulent flow due to the acceleration (see FIG. 6). A transition point is determined by a comparison unit 15 as in the first embodiment, but in the present embodiment, a change in acceleration is compensated for the transition point. As a result, the air flow rate measurement device 1 according to the second embodiment can provide a pulsation error correction process capable of reducing the pulsation error in the low flow rate region as compared with the related art.

Third Embodiment

A configuration example of an air flow rate measurement device according to the third embodiment of the present invention will be described next with reference to FIG. 9.

Figure 9:
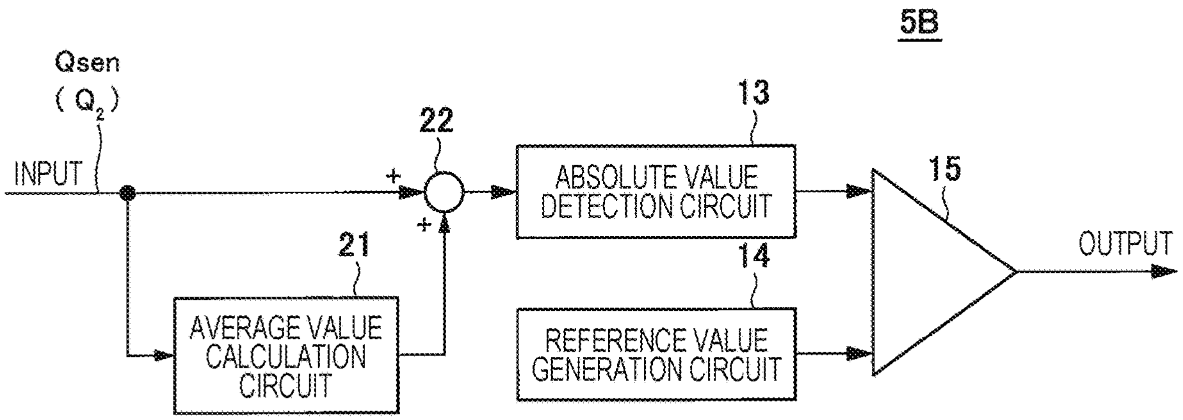
FIG. 9 is a block diagram showing a configuration example of a laminar flow/turbulent flow determination unit according to a third embodiment of the present invention.

FIG. 9 is a block diagram illustrating a configuration example of a laminar flow/turbulent flow determination unit 5B according to the third embodiment.

An air flow rate measurement device 1 according to the third embodiment is basically the same as the air flow rate measurement device 1 according to the first embodiment but is different in including the laminar flow/turbulent flow determination unit 5B in which the configuration of the laminar flow/turbulent flow determination unit 5 is changed as shown in FIG. 9. The laminar flow/turbulent flow determination unit 5B according to the third embodiment basically has a function of performing laminar flow/turbulent flow determination similarly to the laminar flow/turbulent flow determination unit 5 according to the first embodiment. Note that the laminar flow/turbulent flow determination unit (the laminar flow/turbulent flow determination unit 5B) determines whether the air flow is a laminar flow or a turbulent flow based on the average value of an input signal Qsen. Therefore, the laminar flow/turbulent flow determination unit 5B is added with an average value calculation circuit 21 that obtains the average value of the input signal Qsen and an addition unit 22 that obtains the sum of the input signal Qsen and the output of the average value calculation circuit 21.

The flow velocity at which a laminar flow transitions to a turbulent flow depends on the flow velocity in a steady flow. When the flow velocity is small, the air flow becomes a laminar flow. When the flow velocity is large, the air flow becomes a turbulent flow. However, in a pulsation flow, the average value of the flow velocity is easily affected. In order to cope with this, in the third embodiment, the average value calculation circuit 21 is provided to obtain the average value of the flow velocity, and the addition unit 22 that adds the input signal Qsen and the average value output from the average value calculation circuit 21 is provided. As the average value of the flow velocities increases, the flow velocity added to the input signal Qsen by the addition unit 22 increases. In contrast, as the average value of the flow velocities decreases, the flow velocity added to the input signal Qsen by the addition unit 22 decreases.

Therefore, by providing the addition unit 22, the laminar flow/turbulent flow determination unit 5B can more accurately obtain the transition point between a laminar flow and a turbulent flow (see FIG. 6) based on the average value of the flow velocities. Similarly to the first exemplary embodiment, a transition point is determined by a comparison unit 15. As a result, the air flow rate measurement device 1 according to the third embodiment can provide a pulsation error correction process capable of reducing the pulsation error in the low flow rate region as compared with the related art.

Fourth Embodiment

A configuration example of an air flow rate measurement device according to the fourth embodiment of the present invention will be described next with reference to FIG. 10.

Figure 10:
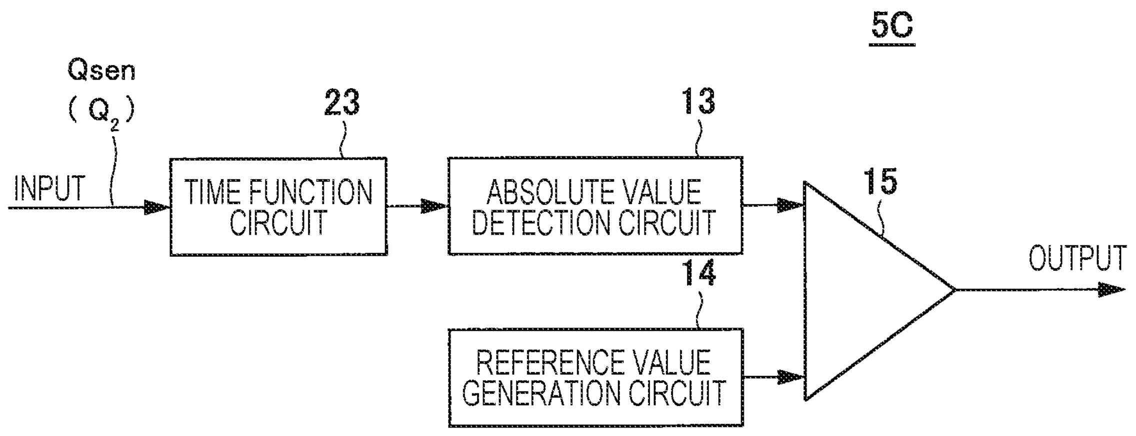
FIG. 10 is a block diagram showing a configuration example of a laminar flow/turbulent flow determination unit according to a fourth embodiment of the present invention.

FIG. 10 is a block diagram illustrating a configuration example of a laminar flow/turbulent flow determination unit 5C according to the fourth embodiment.

An air flow rate measurement device 1 according to the fourth embodiment is basically the same as the air flow rate measurement device 1 according to the first embodiment but is different in including the laminar flow/turbulent flow determination unit 5C in which the configuration of the laminar flow/turbulent flow determination unit 5 is changed as shown in FIG. 10. The laminar flow/turbulent flow determination unit 5C according to the fourth embodiment basically has a function of performing laminar flow/turbulent flow determination similarly to the laminar flow/turbulent flow determination unit 5 according to the first embodiment. Note that the laminar flow/turbulent flow determination unit (the laminar flow/turbulent flow determination unit 5C) determines whether the air flow is a laminar flow or a turbulent flow based on the time function of an input signal Qsen. Therefore, a time function circuit 23 that delays the input signal Qsen is added to the laminar flow/turbulent flow determination unit 5C.

The transition from a laminar flow to a turbulent flow or the transition from a turbulent flow to a laminar flow does not immediately occur at a predetermined flow velocity but is delayed in time. In order to cope with this, in the fourth embodiment, the time function circuit 23 is provided to delay the input signal Qsen, so that the transition point between a laminar flow and a turbulent flow (see FIG. 6) can be obtained temporally more accurately. Here, the time function is a function that delays the input signal Qsen as described above. Since a growth time is required for an air flow to become a laminar flow, a process of delaying by the growth time is performed. As a result, the air flow rate measurement device 1 according to the fourth embodiment can provide a pulsation error correction process capable of reducing the pulsation error in the low flow rate region as compared with the related art.

Fifth Embodiment

A configuration example of an air flow rate measurement device according to the fifth embodiment of the present invention will be described next with reference to FIG. 11.

Figure 11:
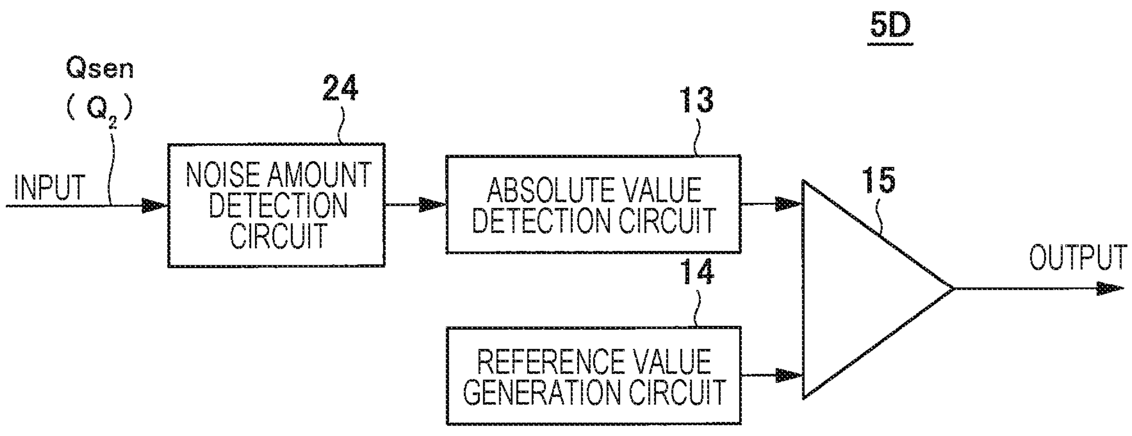
FIG. 11 is a block diagram showing a configuration example of a laminar flow/turbulent flow determination unit according to a fifth embodiment of the present invention.

FIG. 11 is a block diagram illustrating a configuration example of a laminar flow/turbulent flow determination unit 5D according to the fifth embodiment.

An air flow rate measurement device 1 according to the fifth embodiment is basically the same as the air flow rate measurement device 1 according to the first embodiment but is different in including the laminar flow/turbulent flow determination unit 5D in which the configuration of the laminar flow/turbulent flow determination unit 5 is changed as shown in FIG. 11. The laminar flow/turbulent flow determination unit 5D according to the fifth embodiment basically has a function of performing laminar flow/turbulent flow determination similarly to the laminar flow/turbulent flow determination unit 5 according to the first embodiment. Note that the laminar flow/turbulent flow determination unit (the laminar flow/turbulent flow determination unit 5D) determines whether the air flow is a laminar flow or a turbulent flow based on the noise amount of an input signal Qsen. Therefore, a noise amount detection circuit 24 for detecting the amount of noise of the input signal Qsen is added to the laminar flow/turbulent flow determination unit 5D.

Since the transition from a laminar flow to a turbulent flow is affected by the flow velocity, acceleration, delay, and the like, it is difficult to accurately grasp the transition. However, it is known that the turbulence of an air flow changes between a turbulent flow and a laminar flow. Such turbulence of the air flow is referred to as "noise". In a turbulent flow, a vortex is generated in the flow path, and the flow velocity changes, so that noise is large. In contrast, a laminar flow has little noise because there is no vortex and the flow velocity does not change. Therefore, the comparison unit 15 can determine the difference between a laminar flow and a turbulent flow by the magnitude of noise. Therefore, the laminar flow and the turbulent flow can be distinguished by detecting the amount of noise of the input signal Qsen of the air flow rate detection device 2. In the fifth embodiment, the noise amount detection circuit 24 is provided so that the transition between a laminar flow and a turbulent flow can be obtained. As a result, the air flow rate measurement device 1 according to the fifth embodiment can provide a pulsation error correction process capable of reducing the pulsation error in the low flow rate region as compared with the related art.

[Modification]

The air flow rate measurement device 1 according to each embodiment described above is configured by an electronic control device mounted on a vehicle or the like. The calculation unit 3 according to each embodiment may be one function of the electronic control device. In addition to the vehicle, the electronic control device may be used as a device capable of measuring the air flow rate in the pipe in which the air flow rate detection device 2 is installed.

Note that the present invention is not limited to the above-described embodiments, and it goes without saying that various other application examples and modifications can be taken without departing from the gist of the present invention described in the claims.

For example, the above-described embodiments describe the configuration of the device in detail and specifically in order to describe the present invention in an easy-to-understand manner, and are not necessarily limited to those having all the described configurations. In addition, part of the configuration of the embodiment described here can be replaced with the configuration of another embodiment, and furthermore, the configuration of another embodiment can be added to the configuration of an embodiment. In addition, it is also possible to add, delete, and replace other configurations for part of the configuration of each embodiment.

In addition, the control lines and the information lines indicate what is considered to be necessary for the description and do not necessarily indicate all the control lines and the information lines on the product. In practice, it may be considered that almost all the configurations are connected to each other.

REFERENCE SIGNS LIST

1 air flow rate measurement device
2 air flow rate detection device
3 calculation unit
4 third input signal calculation unit
5, 5A to 5D laminar flow/turbulent flow determination unit
6 first input signal calculation unit
7 second input signal calculation unit
8 switching unit
9 subtraction unit
10 integration unit
11 output signal calculation unit
12 addition unit
13 absolute value detection circuit
14 reference value generation circuit
15 comparator
16 intake pipe
17 sub-passage
18 main passage

The invention claimed is:

1. An air flow rate measurement device comprising:

an air flow rate detection device which detects an air flow rate of an air flow moving in a pipe and generates an input signal corresponding to the air flow rate;

a calculation unit which determines whether the air flow is a laminar flow or a turbulent flow based at least on the input signal and outputs:

a result of calculation using an output result obtained by performing proportional calculation on the input signal in response to determining that the air flow is the laminar flow as an output signal corresponding to the air flow rate; or a result of calculation using an output result obtained by performing square calculation on the input signal in response to determining that the air flow is the turbulent flow as an output signal corresponding to the air flow rate, wherein the calculation unit includes:

a first input signal calculation unit which performs square calculation on the input signal;

a second input signal calculation unit which performs proportional calculation on the input signal;

a third input signal calculation unit which performs calculation based at least on a length of a pipe in which the air flow rate detection device is installed with respect to the input signal;

a laminar flow/turbulent flow determination unit which determines whether the air flow is a laminar flow or a turbulent flow;

a switching unit which switches between an output result obtained by the first input signal calculation unit and an output result obtained by the second input signal calculation unit based at least on a determination result obtained by the laminar flow/turbulent flow determination unit;

an output signal calculation unit which performs square calculation on the output signal;

a subtraction unit which obtains a difference between the output result obtained by the first input signal calculation unit or the output result obtained by the second input signal calculation unit switched by the switching unit and the output result obtained by the output signal calculation unit;

an integration unit which integrates the difference and outputs an integration result; and an addition unit which outputs the output signal obtained by adding the output result obtained by the third input signal calculation unit and the integration result.

2. The air flow rate measurement device according to claim 1, wherein the laminar flow/turbulent flow determination unit determines whether the air flow is a laminar flow or a turbulent flow based at least on an instantaneous value of the input signal.

3. The air flow rate measurement device according to claim 1, wherein the laminar flow/turbulent flow determination unit determines whether the air flow is a laminar flow or a turbulent flow based at least on a differential value of the input signal.

4. The air flow rate measurement device according to claim 1, wherein the laminar flow/turbulent flow determination unit determines whether the air flow is a laminar flow or a turbulent flow based at least on an average value of the input signal.

5. The air flow rate measurement device according to claim 1, wherein the laminar flow/turbulent flow determination unit determines whether the air flow is a laminar flow or a turbulent flow based at least on a time function of the input signal.

6. The air flow rate measurement device according to claim 1, wherein the laminar flow/turbulent flow determination unit determines whether the air flow is a laminar flow or a turbulent flow based at least on an amount of noise of the input signal.

7. An air flow rate measurement method performed by an air flow rate measurement device including an air flow rate detection device which detects an air flow rate of an air flow moving in a pipe and a calculation unit, the method comprising:

performing a process of causing the air flow rate detection device to detect the air flow rate and generate an input signal corresponding to the air flow rate;

performing a process of causing the calculation unit to determine whether the air flow is a laminar flow or a turbulent flow based at least on the input signal and output:

a result of calculation using an output result obtained by performing proportional calculation on the input signal in response to determining that the air flow is the laminar flow as an output signal corresponding to the air flow rate; or a result of calculation using an output result obtained by performing square calculation on the input signal in response to determining that the air flow is the turbulent flow as an output signal corresponding to the air flow rate performing a process of causing a first input signal calculation unit to perform square calculation on the input signal;

performing a process of causing a second input signal calculation unit to perform proportional calculation on the input signal;

performing a process of causing a third input signal calculation unit to perform calculation based at least on a length of a pipe in which the air flow rate detection device is installed with respect to the input signal;

performing a process of causing a laminar flow/turbulent flow determination unit to determine whether the air flow is a laminar flow or a turbulent flow;

performing a process of causing a switching unit to switch between an output result obtained by the first input signal calculation unit and an output result obtained by the second input signal calculation unit based at least on a determination result obtained by the laminar flow/turbulent flow determination unit;

performing a process of causing an output signal calculation unit to perform square calculation on the output signal;

performing a process of causing a subtraction unit to obtain a difference between the output result obtained by the first input signal calculation unit or the output result obtained by the second input signal calculation unit switched by the switching unit and the output result obtained by the output signal calculation unit;

performing a process of causing an integration unit to integrate the difference and outputs an integration result; and performing a process of causing an addition unit to output the output signal obtained by adding the output result obtained by the third input signal calculation unit and the integration result.

8. The method according to claim 7, further comprising performing a process of causing the laminar flow/turbulent flow determination unit to determine whether the air flow is a laminar flow or a turbulent flow based at least on an instantaneous value of the input signal.

9. The method according to claim 7, further comprising performing a process of causing the laminar flow/turbulent flow determination unit to determine whether the air flow is a laminar flow or a turbulent flow based at least on a differential value of the input signal.

10. The method according to claim 7, further comprising performing a process of causing the laminar flow/turbulent flow determination unit to determine whether the air flow is a laminar flow or a turbulent flow based at least on an average value of the input signal.

11. The method according to claim 7, further comprising performing a process of causing the laminar flow/turbulent flow determination unit to determine whether the air flow is a laminar flow or a turbulent flow based at least on a time function of the input signal.

12. The method according to claim 7, further comprising performing a process of causing the laminar flow/turbulent flow determination unit to determine whether the air flow is a laminar flow or a turbulent flow based at least on an amount of noise of the input signal.

* * * * *